United States Patent
Berg et al.

(10) Patent No.: US 9,246,614 B2
(45) Date of Patent: *Jan. 26, 2016

(54) METHODS AND DEVICES FOR TRANSMISSION LINE ANALYSIS

(71) Applicant: Telefonaktiebolaget L M Ericsson (publ), Stockholm (SE)

(72) Inventors: Miguel Berg, Upplands Väsby (SE); Daniel Cederholm, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,020

(22) Filed: May 29, 2014

(65) Prior Publication Data

US 2014/0313919 A1    Oct. 23, 2014

Related U.S. Application Data

(63) Continuation of application No. 13/148,550, filed as application No. PCT/SE2009/050474 on Apr. 30, 2009, now Pat. No. 8,767,809.

(60) Provisional application No. 61/151,714, filed on Feb. 11, 2009.

(51) Int. Cl.
| | |
|---|---|
| *H04B 17/00* | (2015.01) |
| *H04J 1/16* | (2006.01) |
| *H04M 3/30* | (2006.01) |
| *H04B 3/46* | (2015.01) |

(52) U.S. Cl.
CPC ... *H04J 1/16* (2013.01); *H04B 3/46* (2013.01); *H04M 3/306* (2013.01)

(58) Field of Classification Search
CPC .. G01R 31/085; G01R 31/3275; G01R 27/06; H04M 3/085; H04M 3/10; H04M 3/30
See application file for complete search history.

(56) References Cited

U.S. PATENT DOCUMENTS

| | | | |
|---|---|---|---|
| 6,725,176 B1 | 4/2004 | Long et al. | |
| 7,023,963 B1 * | 4/2006 | Chu et al. | 379/15.05 |
| 2002/0067802 A1 * | 6/2002 | Smith et al. | 379/1.04 |
| 2002/0114383 A1 | 8/2002 | Belge et al. | |

(Continued)

FOREIGN PATENT DOCUMENTS

| | | |
|---|---|---|
| CA | 2297871 A1 | 8/2001 |
| WO | 0161977 A2 | 8/2001 |
| WO | 2006059175 A1 | 6/2006 |

OTHER PUBLICATIONS

International Search Report for PCT/SE2009/050474 mailed Feb. 4, 2010.

(Continued)

*Primary Examiner* — Aristocratis Fotakis
(74) *Attorney, Agent, or Firm* — Patent Portfolio Builders PLC

(57) ABSTRACT

Improved diagnostics of transmission line noise are enabled by adapting DSL equipment to make measurements of quiet line noise also in the transmit bands, so that noise can be measured at both ends for the same frequency or frequency bands.

An estimate of the point where noise enters the line, as well as an estimate of the noise power at that point can be made from the relationship between the so measured noise levels at both ends of the line.

20 Claims, 14 Drawing Sheets

(56) References Cited

U.S. PATENT DOCUMENTS

| | | | |
|---|---|---|---|
| 2002/0181665 A1 | 12/2002 | Belge et al. | |
| 2004/0189317 A1* | 9/2004 | Borchert et al. | 324/512 |
| 2005/0036560 A1 | 2/2005 | Lu et al. | |
| 2005/0141673 A1 | 6/2005 | Lunt et al. | |
| 2006/0176631 A1* | 8/2006 | Cannon | 361/80 |
| 2006/0198500 A1 | 9/2006 | Defoort | |
| 2006/0227940 A1 | 10/2006 | Ferdosi et al. | |
| 2007/0022331 A1 | 1/2007 | Jamieson et al. | |
| 2007/0165788 A1 | 7/2007 | Defoort et al. | |
| 2010/0312506 A1* | 12/2010 | Taylor | 702/59 |
| 2011/0285400 A1 | 11/2011 | Defoort et al. | |
| 2014/0321623 A1* | 10/2014 | Dardenne et al. | 379/22.04 |
| 2015/0189075 A1* | 7/2015 | Hwang et al. | 324/512 |

OTHER PUBLICATIONS

Written Opinion for PCT/SE2009/050474 mailed Feb. 4, 2010.

International Telecommunication Union, "Asymmetric digital subscriber line transceivers 2 (ADSL2)—Extended bandwidth (ADSL2plus)—Annex C: Specific requirements for an ADSL system operating in the same cable as ISDN as defined in Appendix III of Recommendation ITU-T G.961," Series G: Transmission Systems and Media, Digital Systems and Networks—Digital sections and digital line system—Access networks, Recommendation ITU-T G.992.5, Annex C, Jan. 2009, pp. 1-66.

International Telecommunication Union, "Asymmetric digital subscriber line transceivers 2 (ADSL2)—Extended bandwidth (ADSL2plus)," Series G: Transmission Systems and Media, Digital Systems and Networks—Digital sections and digital line system—Access networks, Recommendation ITU-T G.992.5, Jan. 2009, pp. 1-110.

International Telecommunication Union, "Single-ended line testing for digital subscriber lines (DSL)," Series G: Transmission Systems and Media, Digital Systems and Networks—Digital sections and digital line system—Access networks, Recommendation ITU-T G.996.2, May 2009, pp. 1-46.

International Telecommunication Union, "Very high speed digital subscriber line transceivers 2 (VDSL2)," Series G: Transmission Systems and Media, Digital Systems and Networks—Digital sections and digital line system—Access networks, Recommendation ITU-T G.993.2, Feb. 2006, pp. 1-252.

International Telecommunication Union, "Physical layer management for digital subscriber line (DSL) transceivers," Series G: Transmission Systems and Media, Digital Systems and Networks—Digital sections and digital line system—Access networks, Recommendation ITU-T G.997.1, Apr. 2009, pp. 1-128.

International Telecommunication Union, "Asymmetric digital subscriber line transceivers 2 (ADSL2)," Series G: Transmission Systems and Media, Digital Systems and Networks—Digital sections and digital line system—Access networks, Recommendation ITU-T G.992.3, Apr. 2009, pp. 1-404.

International Telecommunication Union, "Asymmetric digital subscriber line transceivers 2 (ADSL2)—Annex C: Specific requirements for an ADSL system operating in the same cable as ISDN as defined in Appendix III of Recommendation ITU-T G. 961," Series G: Transmission Systems and Media, Digital Systems and Networks—Digital sections and digital line system—Access networks, Recommendation ITU-T G.992.3, Annex C, Apr. 2009, pp. 1-296.

* cited by examiner

```
┌─────────────────┐
│ Measure noise level at a │
│ frequency or frequency   │
│ band which is within a   │──── 1310
│ transmit band of the     │
│ DSLAM                    │
└─────────────────┘
```

Fig. 13

METHODS AND DEVICES FOR TRANSMISSION LINE ANALYSIS

RELATED APPLICATIONS

This application is a continuation of U.S. patent application Ser. No. 13/148,550, filed on Sep. 23, 2011, entitled "Methods and Devices for Transmission Line Analysis", which is a 371 of International Application No. PCT/SE2009/050474, filed on Apr. 30, 2009, International Publication No. WO/2010/093300, published on Aug. 19, 2010, which is related to, and claims priority from, U.S. Provisional Patent Application No. 61/151,714, filed on Feb. 11, 2009, the disclosure of which is incorporated here by reference.

TECHNICAL FIELD OF THE INVENTION

The present invention relates to the field of transmission line analysis.

BACKGROUND

DSL (Digital Subscriber Line) is a widespread technology for data communication over existing telecommunications transmission lines.

ADSL2+, described in ITU-T standard G.992.5 and G.992.3 and VDSL2, described in ITU-standard G.993.2 are examples of such technology. ITU-T standard G.997.1 describes physical layer operation and maintenance functions for several DSL standards.

DSL communications equipment is often adapted to perform various operation and maintenance functions, for example to aid in diagnosing communication problems.

ITU-T standards G993.2 and G997.1 describe inter alia that VDSL2 equipment can carry out measurements of quiet line noise (QLN) in the equipment's receive bands. This noise affects the signal to noise ratio (SNR) and hence the achievable data transmission rate and therefore there is a desire to measure this parameter, e.g. for diagnostic purposes. If the transfer function, H, of the line is also measured, the transmit power needed to achieve a particular data rate may be calculated.

In general, there is a desire to provide improved transmission line diagnostics, for example to provide improved diagnostics of noise problems.

SUMMARY OF THE INVENTION

It is an object of the present invention to enable improved diagnostics of noise problems, and a further object to provide such diagnostics.

Existing DSL equipment (DSLAMs and CPEs) generally are able to make some noise level measurements. However, this capability has been focused on making noise measurements in the receive bands, since it is when receiving that noise may be a problem. When transmitting, noise is not a problem, so there has been no interest in measuring noise in the transmit bands.

Hence, noise is measured in different bands at the customer and central office ends of the line respectively.

However, if noise is measured also in the transmit bands (which are the opposite end's receive bands), so that noise is measured at both ends for the same frequencies, it becomes possible to estimate the point along the line where noise enters the line.

It also becomes possible to estimate the noise level at the point where noise enters the line.

Thus, when excessive noise in the receive band is a problem at an end of the line, a position where the noise enters the line and the noise level at that point can be estimated by making such measurements and relating them to each other. Even though at any given end of the line it is only the receive band noise that is a problem, a noise measurement at the other end at the same frequency or frequency band (i.e. in a transmit band) nevertheless provides important diagnostic information. Hence, improved diagnostics of noise problems are enabled when such measurements are possible.

A DSL communications equipment according to the invention therefore is adapted to measure quiet line noise, QLN in at least one of its transmit bands. (Quiet line noise is the noise that is present when the line is not used for transmission). The adaption may be for measurement in a part of or the whole of one or more transmit bands, and the equipment may be e.g. a CPE (Customer Premises Equipment) or a DSLAM (Digital Subscriber Line Access module). For example, measurement can be made on all frequencies normally used for reception and transmission of data. The equipment may conform to a particular DSL standard, such as ADSL2+ or VDSL2.

Corresponding methods that make the measurements that the DSL equipment is adapted for are also applicable. Said equipment and methods enable improved diagnostics.

In other embodiments, improved diagnostics are provided.

In a method for estimating a position where noise enters a line, a measurement result is received via the line from DSL equipment at the far end of the line, and another measurement result is received from DSL equipment at the near end of the line. Then, a position is estimated in dependence of the relationship between the measurement results. Measurement was for the same frequency or frequency band for the equipment at both ends, and the frequency or frequency band falls within a transmit band of at least one of them.

There is also a corresponding device having means for carrying out the steps of the method.

In another method a CPE measures a first noise level at its end of a line and communicates it to a DSLAM at the opposite end. The DSLAM measures a second noise level at the same frequency or frequency band at its end of the line. The frequency or frequency band falls within the transmit band of at least one of the DSLAM or the CPE. Then, a position where noise enters the line is estimated in dependence of the relationship between the first and second noise levels.

It is an advantage of the invention that improved noise diagnostics are enabled.

Another advantage is that improved noise diagnostics may be provided.

An advantage of improved noise diagnostics is that it becomes easier to identify and rectify the causes of excessive line noise.

It is an advantage that the position where noise enters the line can be estimated, as this may significantly reduce costs for travel and field work. In particular, if an underground cable needs to be inspected, pinpointing digging operations can save a lot of money.

An advantage of estimating the level of the noise at the point where it enters the line is that it may provide clues to identifying the noise source.

BRIEF DESCRIPTION OF THE DRAWINGS

FIG. 13 shows a flow chart of a method embodying the invention in a DSLAM.

DETAILED DESCRIPTION OF EMBODIMENTS

In this document, the terms "line" "transmission line" and "loop" will be used interchangeably to denote the twisted copper pair used in DSL systems to join the DSLAM and CPE.

Noise ingress is when noise enters a transmission line, noise ingress point is the point or location where noise enters the line.

Figure 10:
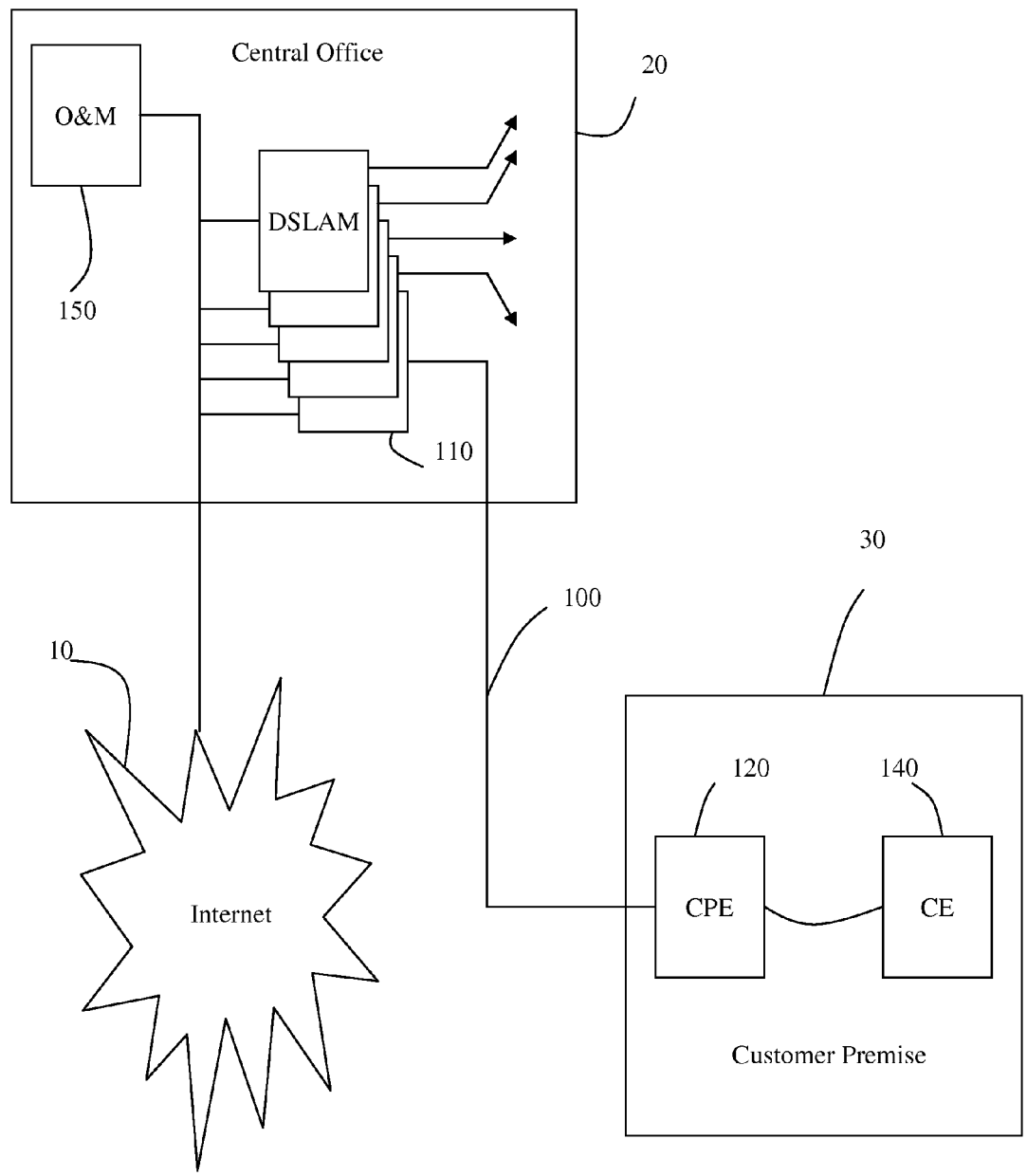
FIG. 10 shows a typical setting for the invention.

FIG. 10 shows a typical setting for a DSL communication system.

A central office 20 connects numerous customer premises sites 30 with telecommunication transmission lines 100. At the customer premises, the lines 100 terminate at DSL modems 120 usually called CPEs (Customer Premises Equipment). The CPEs are normally connected to various other equipment 140, typically personal computers.

At the central office site 20, the lines 100 terminate at DSLAMs 110 (Digital Subscriber Line Access Multiplexer). The DSLAMs are connected to the internet 10, so as to provide internet connectivity to the customer equipment 140 via the lines 100 and the CPEs 120.

An operations and maintenance device (O&M device) 150 for operation and maintenance of the DSL equipment and lines is connected to the DSLAMs. The device may be used to control various operational settings of the DSLAMs 110 as well as requesting the DSLAMs to carry out various diagnostic operations. It may contain a transmission line database holding information about the lines which terminate at the central office 20.

The CPEs and DSLAMs may contain, inter alia, transmit and receive hardware and filter functionality, all of which may be configurable.

DSL Diagnostics

In DSL systems, such as ADSL and VDSL2, physical cable faults in wireline communication systems can be detected with Single-Ended Line Test (SELT), e.g. WO 2006/059175 A1 and Double-Ended Line Test methods (DELT) such as the Loop Diagnostics included in ADSL2 [G.992.3] and VDSL2 [G.993.2] standards. Sometimes, SELT can also be used to locate the position of the fault, e.g. interruption of the cable.

ADSL2 and VDSL2 are examples of FDM (frequency division multiplex) systems. In such systems, the CPE and DSLAM use disjoint frequency bands for their transmission. There is an upstream band for transmission from the CPE to the DSLAM and a downstream band for transmission from the DSLAM to the CPE. The up- and downstream bands may consist of multiple disjoint smaller bands.

Within the bands, data is normally transmitted by modulated carrier tones at particular frequencies called subcarriers.

The bands used for transmission at an end of the line are called transmit bands with respect to that end of the line or with respect to the equipment there, the bands used for reception are likewise called receive bands. Hence, at the CPE the transmit bands make up the upstream and the receive bands make up the downstream, whereas at the DSLAM the transmit bands make up the downstream and the receive bands make up the upstream.

Line noise in a receive band can be a problem. The achievable data rate for a particular carrier frequency is limited by the SNR (Signal to Noise Ratio) at the receiving end, which depends on the transmit power at the transmitting end, the line attenuation and the receive band noise for that frequency.

The achievable data rate is commercially important, as a higher total data rate generally is charged higher. Also, strong noise can affect the stability of a DSL line, leading to customer complaints and thus increased OPEX for the operator.

DSL systems often have the possibility to measure receive band noise levels per subcarrier. This measurement can be used to detect and identify excessive crosstalk and certain other types of noise ingress on the line, e.g. Radio Frequency Interference (RFI) from broadcast stations and some types of impulse noise.

ADSL2 and VDSL2 technologies have built-in standardized Loop Diagnostic functionality that among other things can measure receive band Quiet-Line Noise (QLN), which is the near-end received power when the far-end transmitter is silent, and the logarithmic channel transfer function (HLOG) [G.992.3, G.993.2, G997.1]. These parameters are given with one value per used subcarrier in the configured band plan.

Improved DSL Noise Diagnostics

Noise levels in the transmit band generally do not affect the line performance. However, if QLN nevertheless could be measured also in the transmit band, so that noise could be measured at both ends of the line for the same frequency, this would enable improved diagnostics of noise problems.

In particular, the relationship between noise levels at both ends of the line for a particular frequency may be used to estimate a point along the line where noise enters the line, and also to estimate the noise level at that point.

Thus, in a DSL system, if noise power per subcarrier on a DSL line is measured by the DSLAM (xTU-O) and CPE (xTU-R) with overlap such that at least some subcarriers are measured by both transceivers, this enables improved diagnostics.

By comparing the received power levels at both ends of the line, it is possible to determine if the noise is closer to the operator's side or the remote (customer's) side. If more information is available, such as loop length and/or cable attenuation (e.g. from SELT), a more precise distance to the noise ingress point can be determined.

By locating the noise ingress point automatically, troubleshooting time can be substantially decreased leading to large OPEX savings since the operator will be able to tell e.g. whether the noise source is in the customer's home or a couple of blocks away. This will narrow down the search.

Even approximate knowledge of the location of noise entry may be very useful to rule out possible noise sources, and to decide on a location where further work in the field is to be done. Field work is generally quite expensive.

Theoretical Calculations

This section derives formulas allowing location of the ingress point assuming that noise measurements can be performed for the same subcarriers at both ends of the loop. The formulas are derived under idealized conditions such as homogeneous cables and perfect impedance match at both ends of the loop but are still sufficiently accurate in several practical environments.

All calculations are done independently for each subcarrier meaning that it is possible to locate up to as many narrowband noise sources as there are subcarriers in the measured set.

Figure 1:
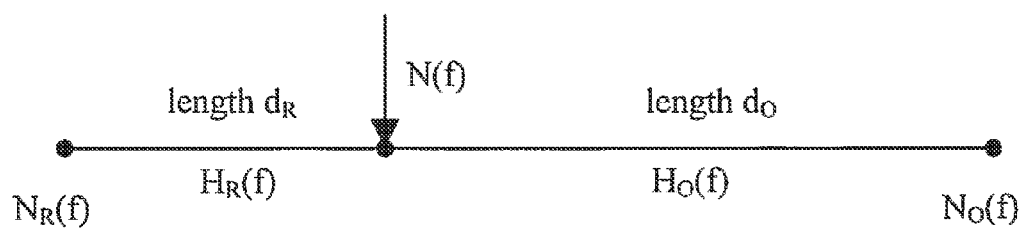
FIG. 1 shows a schematic picture of noise ingress in a DSL line.

FIG. 1 shows a schematic picture of noise ingress in a DSL line. Total cable length is d, split into two segments with length $d_R$ and $d_O$. Noise PSD at the ingress point is $N(f)$, resulting in $N_R(f)$ on the remote side (left) and $N_O(f)$ on the operator's side (right). The cable transfer function (inverse of attenuation) is $H(f)$, with $H_R(f)$ and $H_O(f)$ each for the two segments.

Thus FIG. 1 shows a scenario with a noise ingress point at distance $d_R$ from the remote (customer premises) side. Assuming that distances are given in meters, the noise PSD in dBm/Hz, and transfer function (inverse of attenuation) in dB, we have:

$$N_R(f) = N(f) + H_R(f) \qquad (1)$$

$$N_O(f) = N(f) + H_O(f) \qquad (2)$$

Here, it should be noted that $H(f)$, $H_R(f)$, and $H_O(f)$ are normally negative dB values since the copper loop is passive and does not amplify the noise. Subtracting (1) from (2) gives:

$$N_R(f) - N_O(f) = H_R(f) - H_O(f), \qquad (3)$$

which is independent of the noise PSD at the ingress point. If we don't have any more information available, we could already say from the sign of the left hand side of (3) whether the noise ingress point is (electrically) closer to the operator (O) or the remote (R) side since the right hand side corresponds to the difference in transfer function (dB) between the two segments in FIG. 1.

Equation (3) above can be rewritten by using the fact that the magnitude of the transfer function of a telecommunication cable is proportional to distance for frequencies used in xDSL systems (4), (5), i.e.:

$$H_R(f) = \frac{d_R}{d_R + d_O} H(f), \qquad (4)$$

$$H_O(f) = \frac{d_O}{d_R + d_O} H(f). \qquad (5)$$

Thus, we have:

$$N_R(f) - N_O(f) = \frac{d_R}{d_R + d_O} H(f) - \frac{d_O}{d_R + d_O} H(f),$$

which after rearranging becomes:

$$(N_R(f) - N_O(f)) \frac{d_R + d_O}{H(f)} = d_R - d_O. \qquad (6)$$

This can be further rewritten as $$(N_R(f) - N_O(f)) \frac{1}{H'(f)} = d_R - d_O, \qquad (7)$$

where $H'(f)$ is the normalized transfer function (magnitude) in dB per meter for the used cable. If this property of the cable is known or assumed, we can with help of (7) tell the difference in length between the two cable segments, i.e. how far from the centre the ingress point is located. To get more useful information regarding the noise location, we would also need the loop length. This can for example be measured with SELT, estimated from measured attenuation values, or fetched from data bases describing the copper plant. By utilizing that $d_R + d_O$ equals the loop length d in combination with (6), we get:

$$(N_R(f) - N_O(f)) \frac{d}{H(f)} = d_R - (d - d_R),$$

which after simplification yields the distance from the remote end to the noise ingress point:

$$d_R = \frac{1}{2}\left[d + (N_R(f) - N_O(f)) \frac{d}{H(f)}\right] \qquad (8)$$

If the loop length d is not known, the result may be expressed instead as a percentage of the loop length, which may still be useful.

Once the noise location is determined, we can also calculate the noise PSD $N(f)$ at the ingress point, from equation (1):

$$N(f) = N_R(f) - H_R(f).$$

By rewriting, this yields the noise PSD as:

$$N(f) = N_R(f) - \frac{d_R}{d} H(f) \qquad (9)$$

Often, it is not necessary to know the transfer function $H(f)$ for all frequencies of interest; it is commonly known that the attenuation in dB for many telecommunication cables (typically those with Polyethylene insulation) can be rather accurately estimated by a simple model (A, C=0 in the cable model in section 7.2.1.3.2 in [G.993.2]) from a couple of hundred kilohertz up to at least tens of MHz:

$$\hat{H}(f) = d \cdot k \sqrt{f}, \text{ where } k \text{ is a cable-dependent constant} \qquad (10)$$

In this case, it would be sufficient to measure the transfer function or the attenuation at a single frequency, say 300 kHz or 1 MHz, in order to calculate the cable constant k and the expressions for noise location and noise power would become:

$$\hat{d}_R = \frac{1}{2}\left[d + \frac{N_R(f) - N_O(f)}{k\sqrt{f}}\right], \qquad (11)$$

$$\hat{N}(f) = N_R(f) - d_R \cdot k \sqrt{f} \qquad (12)$$

The calculations presented above are quite simple and should be rather robust. However, some problems that could occur when implementing this in practice are:

Low accuracy on noise PSD measurements in DSLAM and/or CPE necessitating calibration of the hardware in order to get reliable noise PSD values.

Strong crosstalk noise (NEXT or FEXT), drowning the impulse noise or RFI ingress at one or both sides of the loop. Of course, if the noise is drowned by crosstalk at both sides, it could be argued that the noise source is not interesting and will only marginally affect performance of the line.

However, even if only a low quality result is achieved, it may be highly useful. For example, if it can ruled out that the noise source is located at the customer premises, there will be no need to book a visit to the customer's home and no need to ask the customer to look for potential noise sources in her home.

When a noise source spans a frequency band so that the noise from the same source is measured at several frequencies, an improved estimate of the position where the noise enters the line can be achieved by using more than one measurement. For example, a position estimate can be made for each frequency, and a further estimate generated as the average of those estimates.

The invention may thus be embodied as a method in a system comprising a CPE 120, a transmission line 100, a DSLAM 110 and a device for operation and maintenance (O&M device) 150. The invention could also be embodied as a method in the CPE, the DSLAM or the O&M device. Further the invention could be embodied as a CPE, DSLAM or O&M device adapted to carry out the corresponding method.

Figure 11:
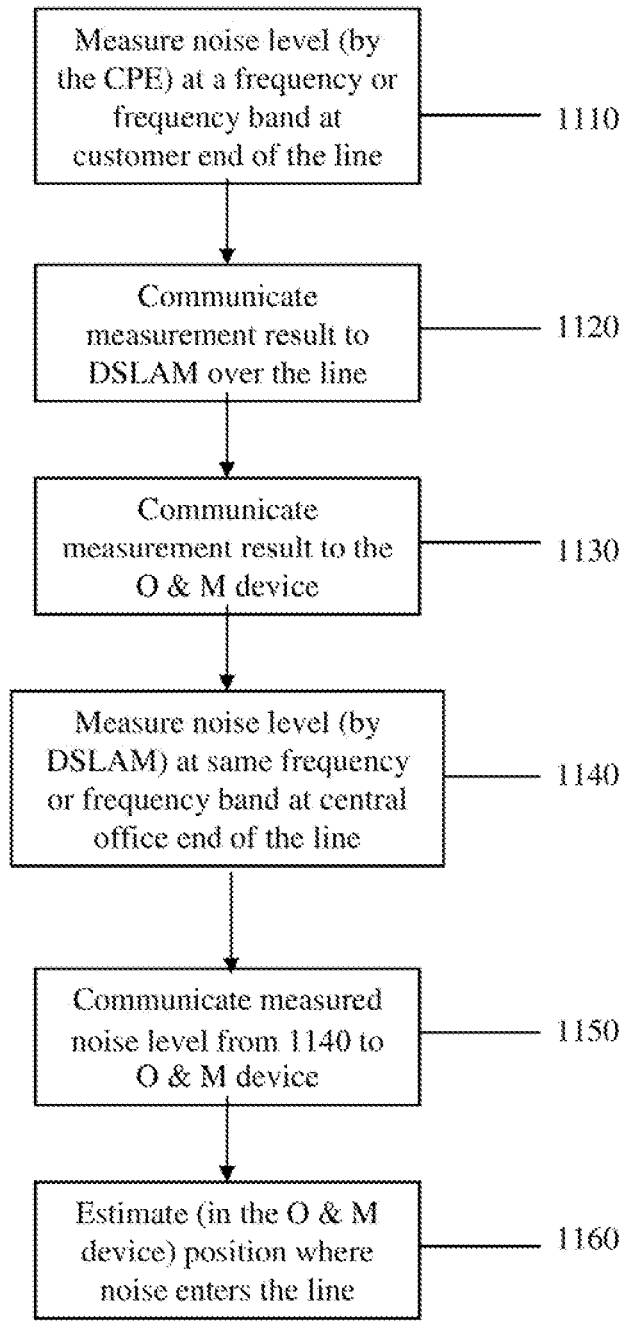
FIG. 11 shows a flow chart of a method embodying the invention.

With reference to FIG. 11, a method embodying the invention is as follows.

In a step 1110 the noise level at a frequency or frequency band at the customer end of the line is measured by the CPE. The frequency or frequency band is within a transmit band of the CPE or the DSLAM.

In a step 1120 the measurement result is communicated over the line to the DSLAM.

In a step 1130 the result is further communicated to the O&M device.

In a step 1140 the noise level is measured at the same frequency or frequency band by the DSLAM at the central office end of the line.

In a step 1150 the result from step 1140 is also communicated to the O&M device.

In a step 1160 a position where noise enters the line is estimated in dependence of the relationship between the noise levels. The estimate is made in the O&M device.

If the O&M device is integrated into the DSLAM, steps 1130 and 1150 are not needed, or take place within the DSLAM.

Figure 12:
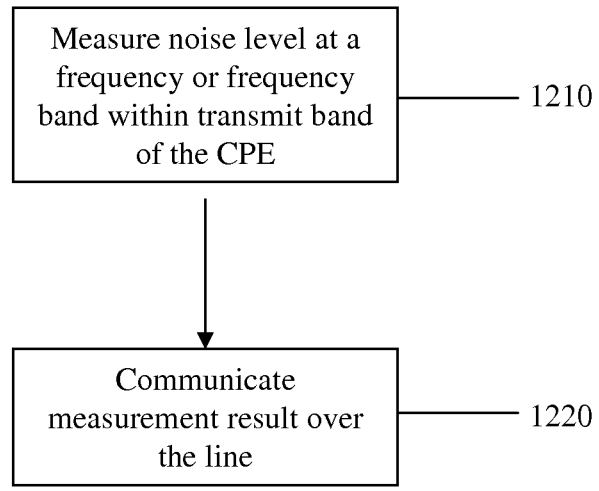
FIG. 12 shows a flow chart of a method embodying the invention in a CPE.

With reference to FIG. 12, a method embodying the invention in a CPE is as follows.

In a step 1210, a noise measurement is made at a frequency or frequency band which is within a transmit band of the CPE.

Optionally, in a step 1220, the result of the measurement is communicated over the line.

(When not performing the step 1220, the measurement may for example be communicated elsewhere, or in another way, or not communicated, e.g. if the measurement is only to be stored, or if it is to be used in the CPE.)

With reference to FIG. 13, a method embodying the invention in a DSLAM is as follows.

In a step 1310, a noise measurement is made at a frequency or frequency band which is within a transmit band of the DSLAM.

Figure 14:
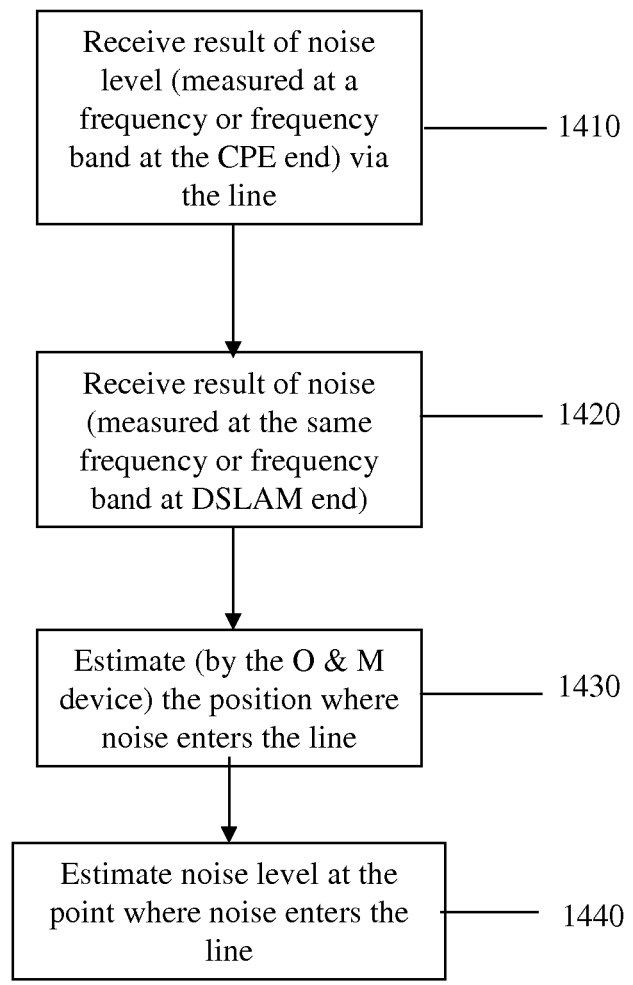
FIG. 14 shows a flow chart of a method embodying the invention in an O&M device.

With reference to FIG. 14, a method embodying the invention in an O&M devices is as follows.

In a step 1410, a result of a noise measurement at a frequency or frequency band at the CPE end of the line made by the CPE is received via the line. The frequency or frequency band is within a transmit band of the CPE or the DSLAM.

In a step 1420, a result of a noise measurement at the same frequency or frequency band at the DSLAM end of the line made by the DSLAM is received.

In a step 1430, an estimate of the position where noise enters the line is made by the O&M device.

In an optional step 1440 an estimate is made of the noise level at the point where noise enters the line.

The methods described above may be embodied in a system according to FIG. 10.

The O&M device 150 is typically a workstation or similar computer. There will be program code in the device for receiving a noise measurement result from the CPE. The result is typically sent from the CPE 120 to the DSLAM 110 over the line and then further to the device 150. There will also be code for receiving a measurement result from the DSLAM 110, and program code for generating an estimate of a position where noise enters the transmission line in dependence of the relationship between the first and the second noise level measurement results. There may also optionally be program code for estimating the noise level at the point where noise enters the line.

In another embodiment the functions of the device 150 are integrated into the DSLAM 110.

The CPE 120 may have program code for, or otherwise be configured to make noise level measurements in one or more of its transmit bands. Any filter through which the measurement is made should be properly applied, so that measurement is made in a pass band of the filter. There may also be program code for sending measurements results over the line.

The DSLAM 110 may have program code for, or otherwise be configured to make noise level measurements in one or more of its transmit bands. Any filter through which the measurement is made should be properly applied, so that measurement is made in a pass band of the filter. There may also be program code for receiving measurement results from the CPE 120 as well as code for sending measurement results to the O&M device 150. The results may be from measurement in the DSLAM 110 or received from the CPE 120.

When performing Loop Diagnostics with hardware supporting ADSL2(+) Annex M subcarriers 32-64 are reported for both ends of the loop but the high- and lowpass filters used by the modems to separate the transmit and receive bands attenuate the measurements too much at one or both ends of the loop. In other words, the overlap in frequency domain is only for the filter edges and not for the filter passbands, which means that it is not usable for practical purposes.

Outside the receiver passbands, the reported results reflect the receiver noise rather than the quiet line noise.

Thus, even though tones which are part of the transmit band may be reported, the measurement is made through the receive band filter, and the transmit band tones are therefore outside of the filter pass band. In general, the measured frequencies should fall within the pass band of the filter through which the measurement was made.

When implementing the above methods in a CPE and/or DSLAM, the following approaches may be taken in order to reuse existing functionality to a suitable degree.

Implement a modified Loop Diagnostics mechanism that measures QLN at both ends of the loop for all used subcarriers Complement the QLN from loop diagnostics with Single-Ended Line test (SELT) noise measurements adapted to measure in transmit bands. e.g. use DSLAM SELT adapted to measure noise PSD on the downstream frequencies (where Loop Diagnostics gives only CPE noise measurements).

Use adapted SELT noise measurements at both ends of the loop, i.e. both DSLAM SELT and CPE SELT.

The first solution is, at least in theory, straightforward but requires changes to existing standards, possibly leading to interoperability problems. Also, not all existing hardware can be adapted to measure on transmit bands. For example, typical ADSL2+ DSLAMs can only be made to measure (receive) on the first 64 (upstream) tones while they can be made to transmit on 512 tones. This situation improves with VDSL2 since a VDSL2 modem must support several different band plans, meaning that the hardware has to be more flexible and allow reception over wider frequency bands.

The second solution is definitely feasible but also suffers from the same hardware limitation problem as the first solution. Further, with current standards, it will only support noise ingress localization in the downstream bands since no noise measurements will be available for the upstream bands in the CPE.

The third solution allows noise localization on all subcarriers jointly supported by the transceivers but requires adapted SELT measurements both at the Central Office (CO) side and at the Customer Premises (CP) side. It should be noted that SELT is currently not yet standardized although a draft first version of the G.linetest (G.996.2) standard was consented by ITU-T SG15/Q4 in December 2008. Further, in the first draft, it is still not agreed on how to manage CPE SELT and how to get the measurement results communicated to the DSLAM side. However, it is expected that the standard will continue to evolve in the near future.

Of the three solutions presented above, number two has the advantage that it can be utilized without modifications to existing CPEs that supports Loop Diagnostics. Of course, the DSLAM should be adapted to support SELT noise measurements for the downstream (transmit) bands.

For accurate location of narrowband noise sources the noise source should be dominant at both ends of the loop, i.e. the majority of the noise measured for a certain subcarrier must come from the same source at both ends of the loop.

However, should that not be the case, even a less accurate estimate may be highly valuable.

NUMERICAL EXAMPLES

The following section will show numerical examples from laboratory experiments in order to verify the potential of the invention.

Figure 2:
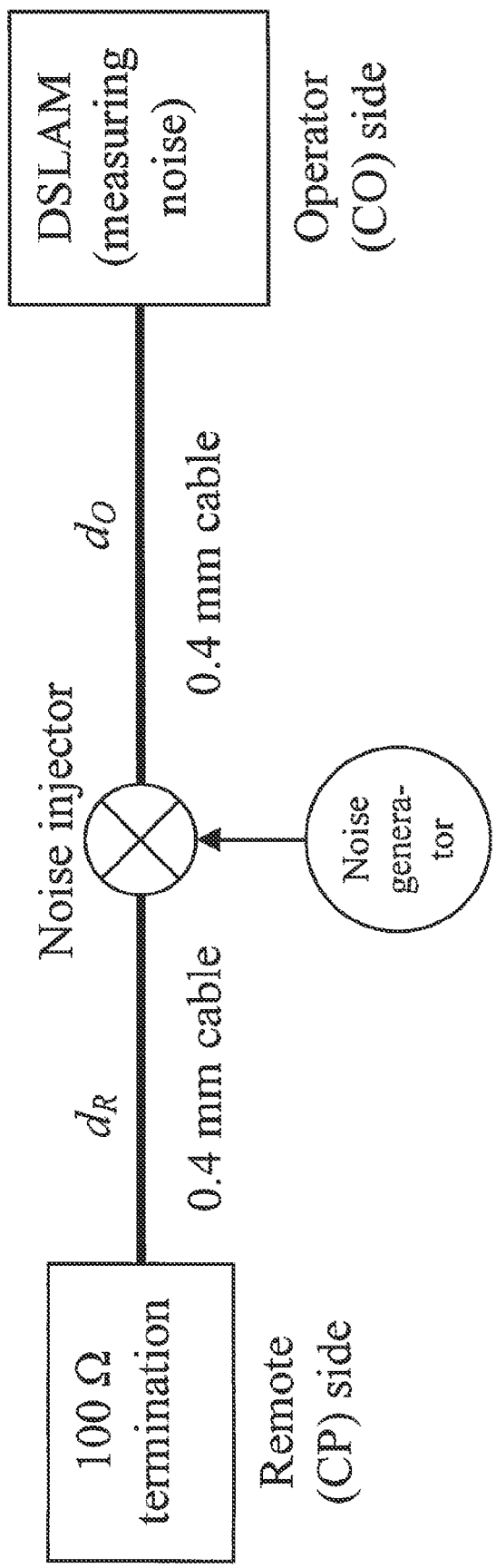
FIG. 2 shows an experimental setup for measuring noise at operator (CO) side of the line.

FIG. 2 shows an experimental setup for measuring noise at operator (CO) side of the line.

Figure 3:
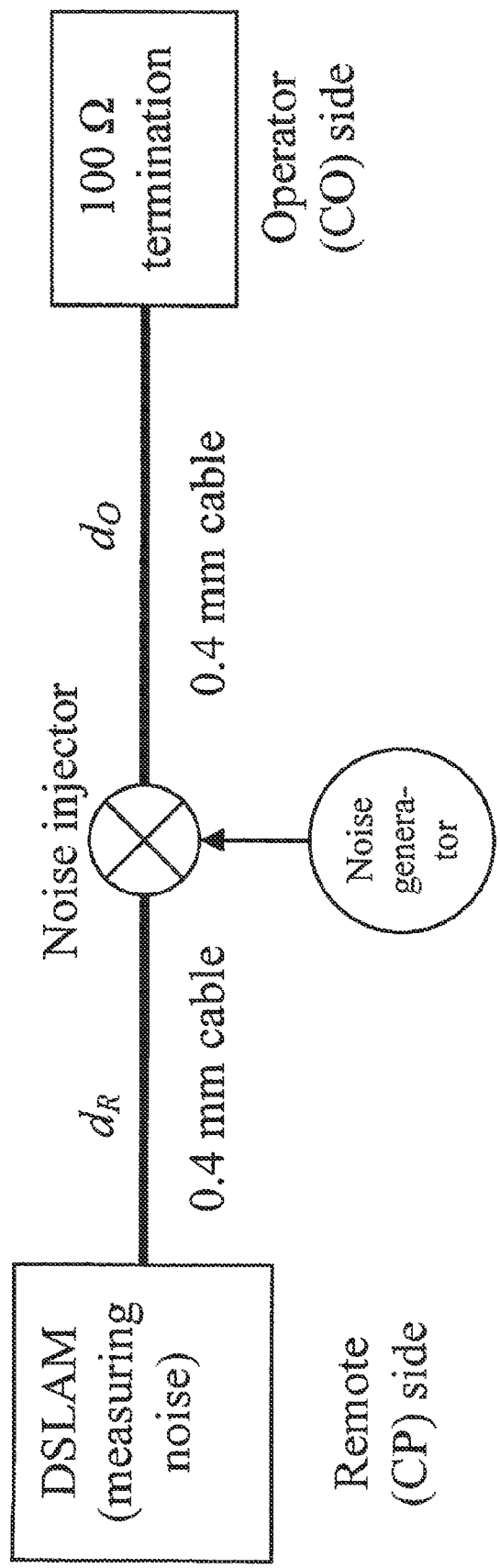
FIG. 3 shows an experimental setup for measuring noise at remote (CP) side of the line.

FIG. 3 shows an experimental setup for measuring noise at remote (CP) side of the line.

To be able to show examples utilizing the whole frequency band up to 17 MHz, laboratory experiments were performed. A VDSL2 DSLAM adapted to measure noise over the full band was used to measure the noise on both sides of a loop consisting of 200+500 meter of 0.4 mm telephone cable. Firstly, the setup in FIG. 2 was used to measure the noise on the whole band for the CO side of the loop and secondly, since no suitably adapted CPE was available, the DSLAM was moved to the other end of the loop according to FIG. 3 in order to measure on the CP side. The latter is unrealistic in a real scenario but was done to visualize the great potential the noise localization method will have if the standards are evolved as discussed earlier.

Figure 4:
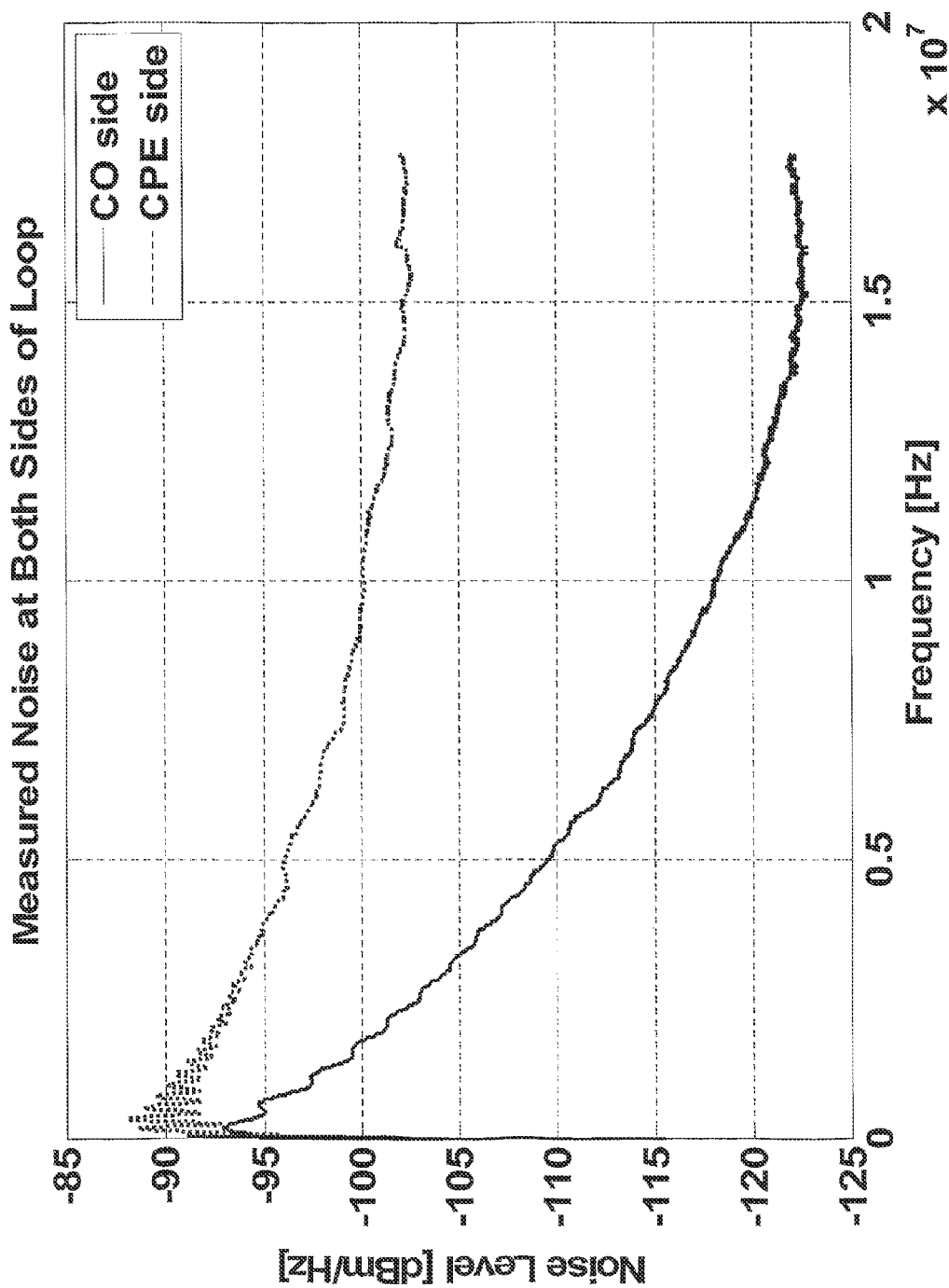
FIG. 4 shows a graph of noise as a function of frequency measured at both sides of a line.

In a first example, Additive White Gaussian Noise (AWGN) with a flat PSD level of −90 dBm/Hz has been injected 500 m from the CO side of a loop with a total length of 700 m. The noise injection point is thus located 200 m from the CP side of the loop. FIG. 4 shows the received noise at both sides of the loop (NO(f) and NR(f)). Since the attenuation is higher for the longer side of the loop the received noise is weaker at the CO side than on the CP side.

Figure 5:
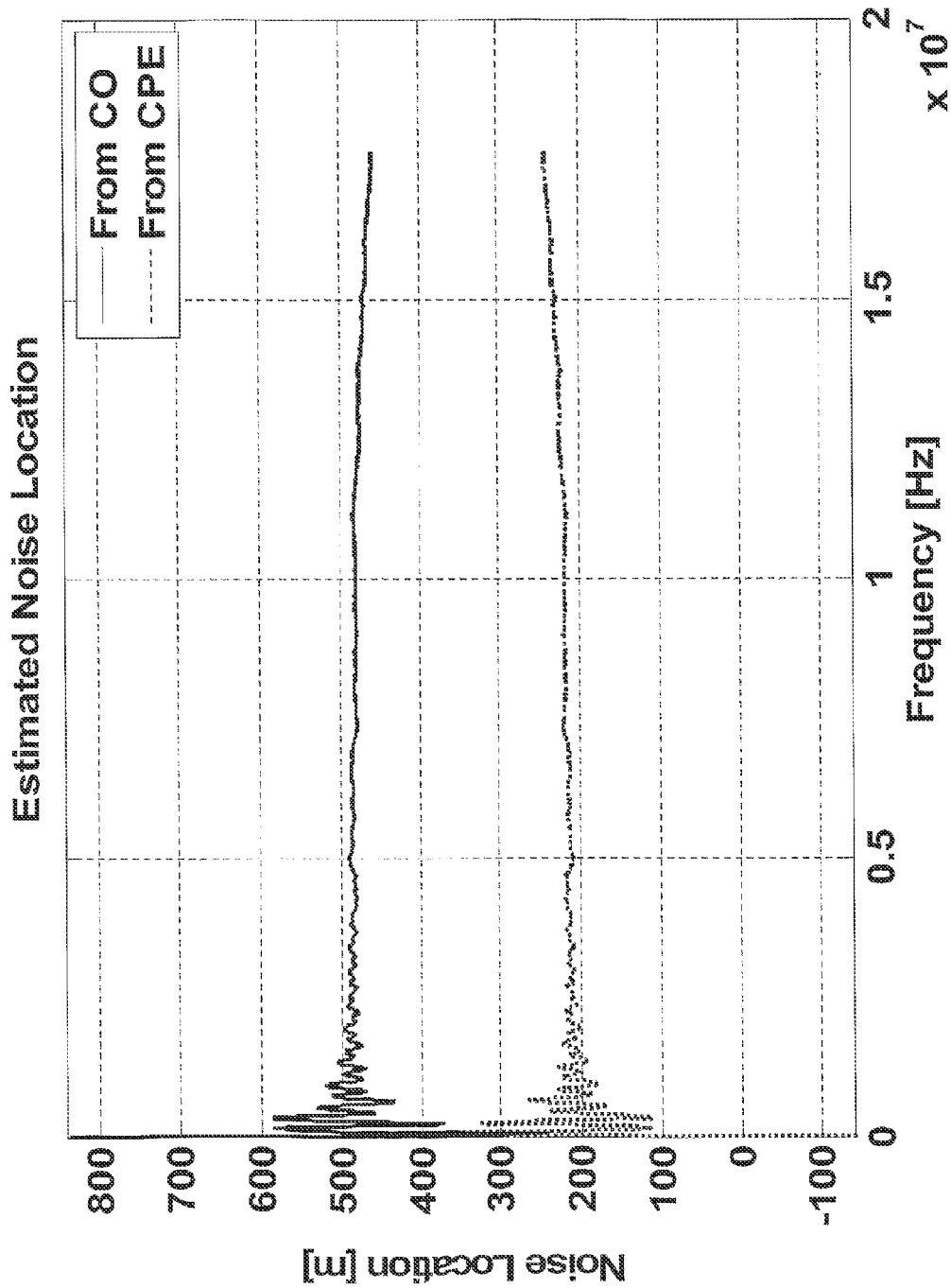
FIG. 5 shows a graph of estimated distance to a noise injection point as a function of frequency.

In this scenario the cable attenuation at 1 MHz was known to be 20.5 dB/km. With this information and the fact that the cable was 700 m long, it is possible to use Equation (11) to estimate the location of the noise injection point. The result from this calculation, i.e. the estimated distance from each end of the loop to the noise injection point, is shown in FIG. 5. As can be seen in the figure, the noise location is estimated to be very close to the true location of 200 m from the CP side and 500 m from the CO side. The error at high frequencies is because the noise was too much attenuated at the CO side for these frequencies so the injected noise was no longer dominant over the background noise when measured at the CO side. This can be seen in FIG. 4 where the noise graph flattens out at high frequencies. The ripple at low frequencies is caused by the noise injector used in the experiment.

Figure 6:
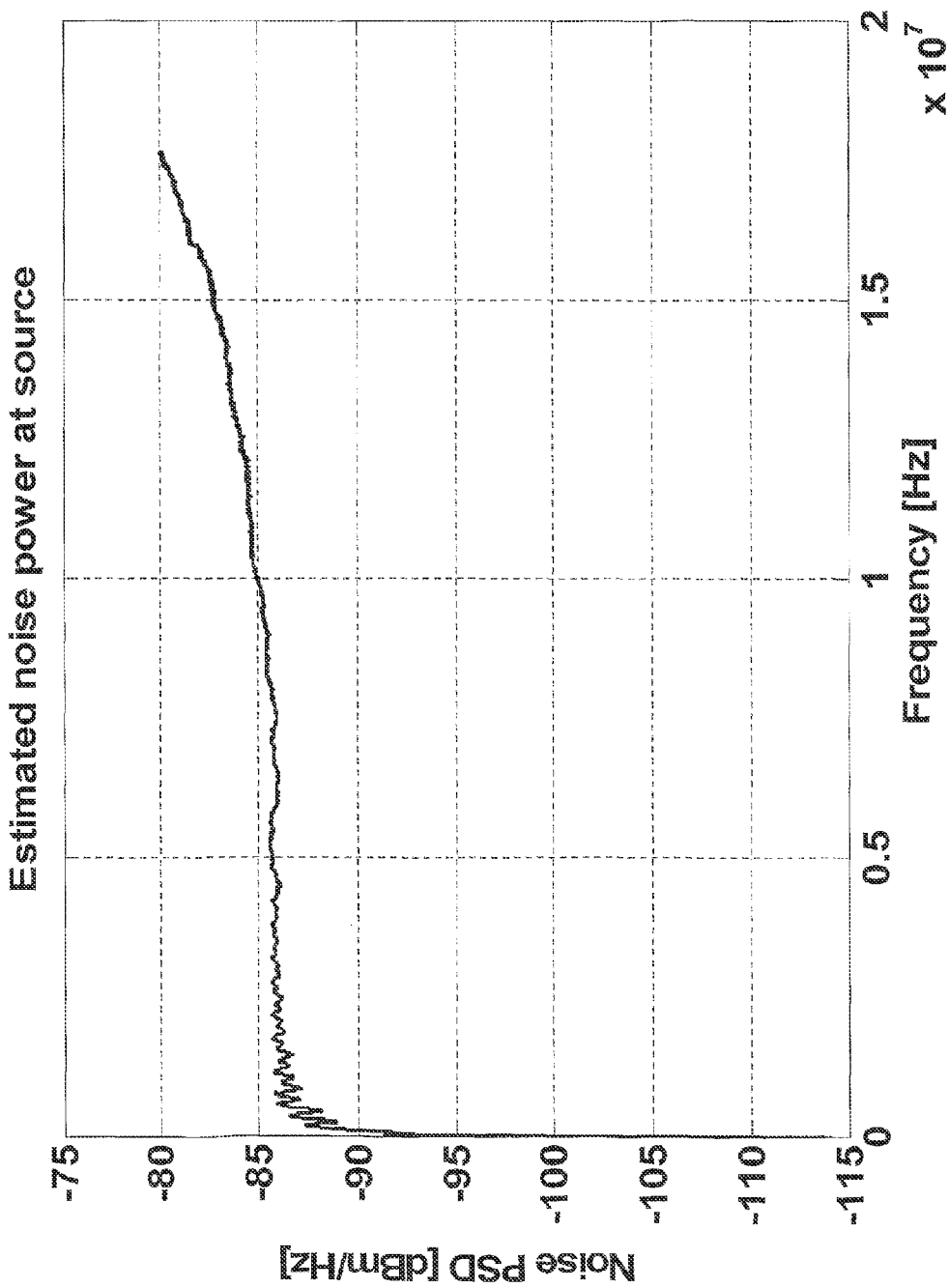
FIG. 6 shows a graph of estimated noise power at an ingress point as a function of frequency.

Finally Equation (12) is used to calculate the PSD of the noise at the injection point as shown in FIG. 6.

The noise is supposed to be flat for the whole spectrum but once again the effect of the weak received noise signal at the CO side can be seen on high frequencies. The offset from −90 dBm/Hz at lower frequencies is likely a combination of measurement errors in the DSLAM, impedance mismatch and imperfect calibration of the noise generator and noise injection box.

A perhaps more common type of noise that could be found on a DSL loop is RFI. The same loop as in the first example has therefore been used again but this time two RFI peaks with a PSD level of −60 dBm/Hz, at 10 MHz and 15 MHz respectively have been injected 500 m from the CO side.

Figure 7:
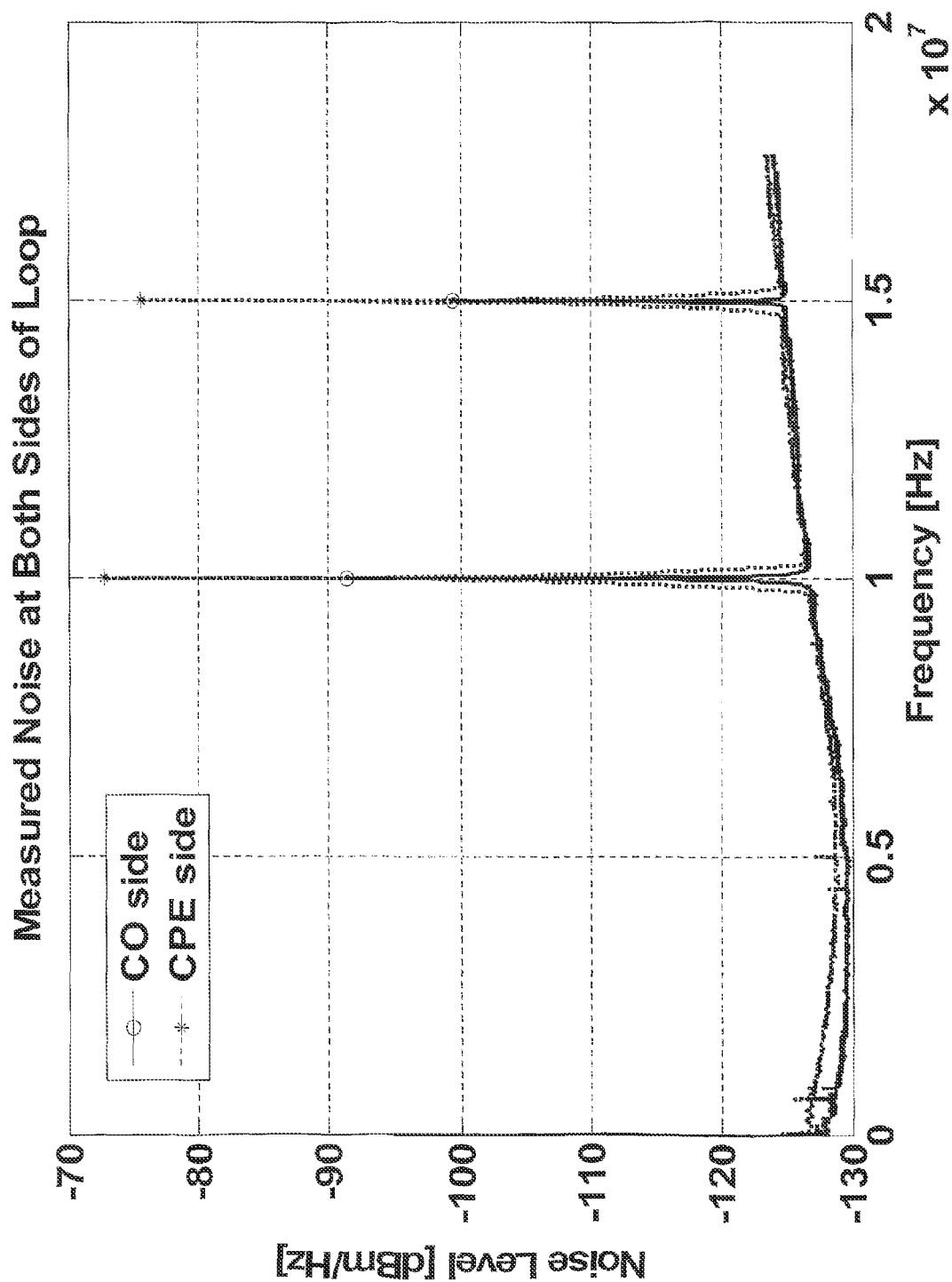
FIG. 7 shows a graph of noise as a function of frequency measured at both sides of a line.

FIG. 7 shows the measured noise on each side of the loop. Two RFI peaks at 10 and 15 MHz have been injected 500 m from the CO side. The measurements are marked with a circle for the CO side and an asterisk for the CPE side.

Figure 8:
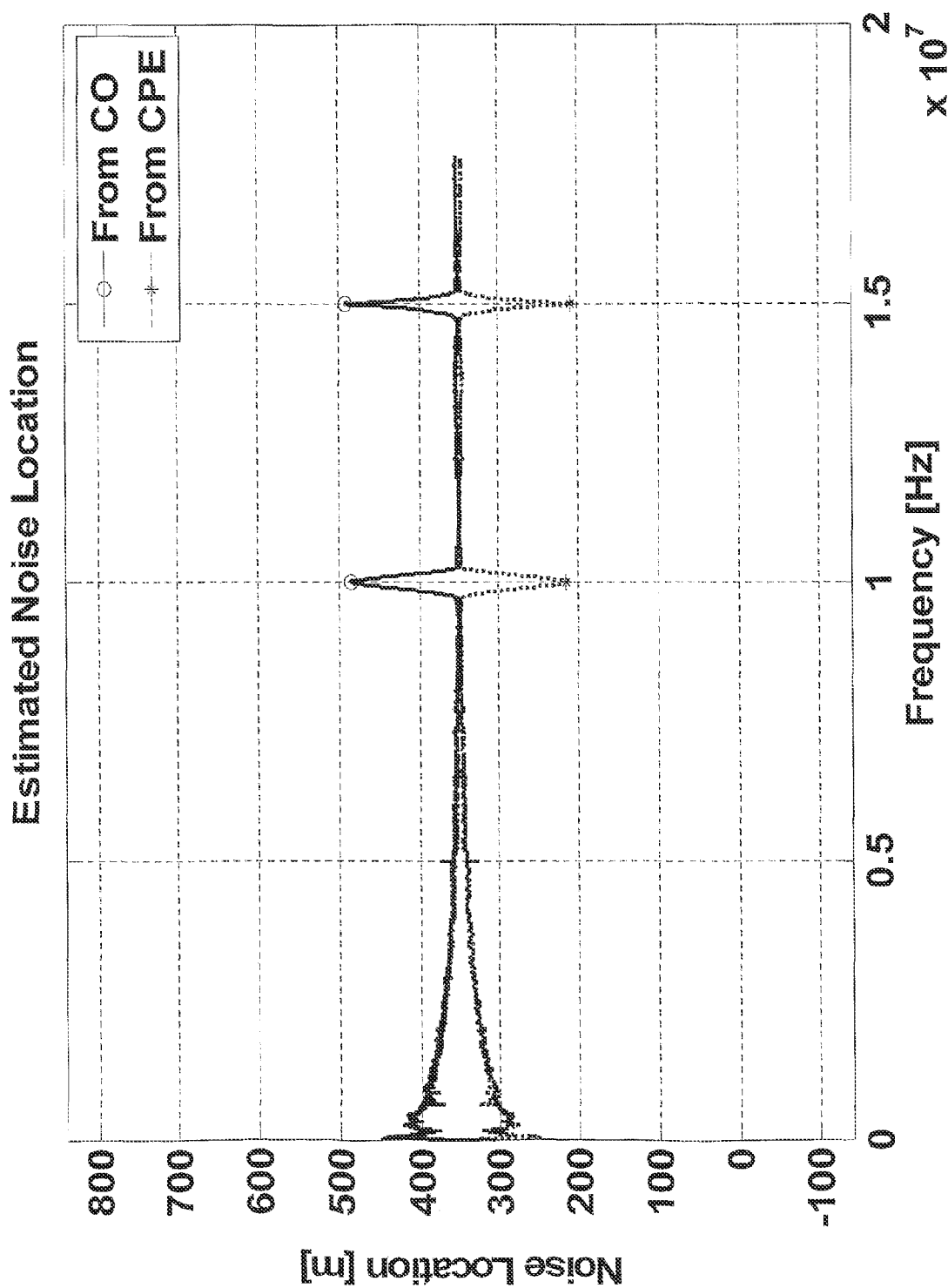
FIG. 8 shows a graph of estimated distance to a noise injection point as a function of frequency.

FIG. 8 shows the estimation of the RFI noise location. The peaks at 10 and 15 MHz are correctly estimated at about 500 m from the CO side.

Since it is only the RFI peaks that are injected at 500 m, the noise at all other frequencies will be located in the middle of the loop i.e. at 350 m (assuming that the background noise has the same PSD at both sides of the loop). The deviation at low frequencies is probably caused by some other noise source in the laboratory, closer to the CP side of the loop. The location of the RFI peaks is correctly estimated at 500 m from the CO side.

Figure 9:
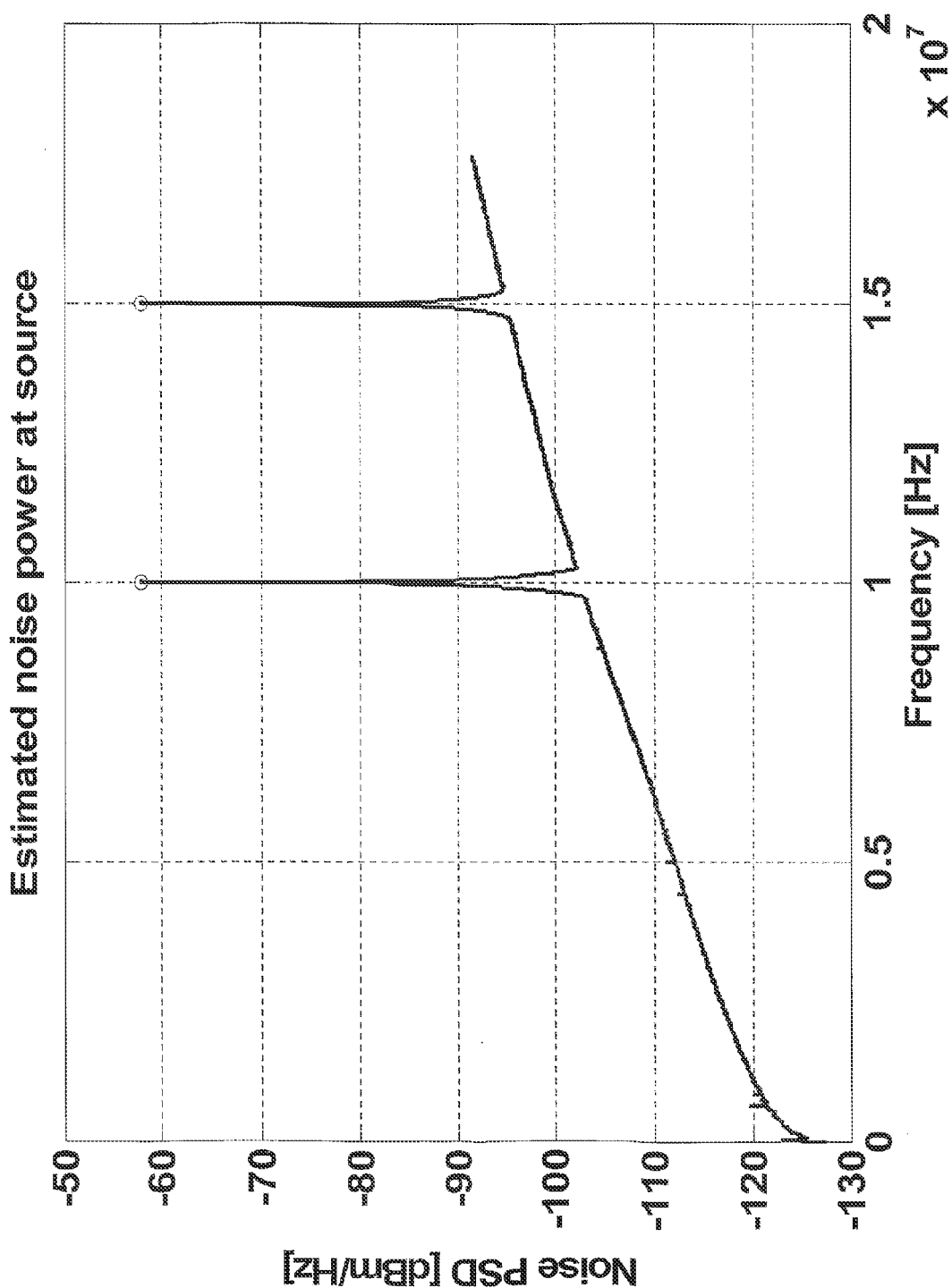
FIG. 9 shows a graph of estimated noise power at an ingress point as a function of frequency.

FIG. 9 shows the estimated noise power at the source. The power at the noise source has been calculated from Equation (12).

The graph shows a slope corresponding to the cable attenuation since it is assumed that the background noise origins from a source close to the middle of the cable. The RFI peaks are well estimated at approximately −60 dBm/Hz.

Since the algorithm assumes that all noise origins from the noise injection point, the background noise is also used in the calculations of the noise power at the source. The background noise is therefore compensated for the attenuation from the end point of the loop to the noise injection point and hence the estimated noise graph at the noise source shows a slope corresponding to the attenuation. In this example it can be seen in FIG. 7 that the noise PSD is low except for the RFI peaks and thus it is only the peaks in FIG. 9 that are of interest. These are correctly estimated to have a PSD of approximately −60 dBm/Hz.

A very crude location estimate can be obtained already from measurement of the noise PSDs at both ends of a loop. Refined location estimates can be achieved by, in addition to the noise measurements, also utilizing loop length and attenuation information. This type of information can be estimated with good accuracy from SELT, DELT or similar methods.

The invention claimed is:

1. A method for estimating a position where noise enters a telecommunications transmission line the line having a first communications equipment connected to a first end of the line and a second communications equipment connected to a second, opposite end of the telecommunications transmission line, the method comprising the following steps:
receiving, via the telecommunications transmission line, a first result of a measurement of a noise level at the first end of the telecommunications transmission line made by the first communications equipment;
receiving a second result of a measurement of a noise level at the second end of the telecommunications transmission line made by the second communications equipment; and
generating an estimate of the position where the noise enters the telecommunications transmission line based on the relationship between the first and the second noise level measurement results where the first and second noise level measurements are made at the same frequency or frequency band and the frequency or frequency band falls within a transmit band of at least one of the first and second communications equipment.

2. The method according to claim 1 wherein a position estimate is generated as $$d_R = \frac{1}{2}\left[d + (N_R(f) - N_O(f))) \frac{d}{H(f)}\right]$$

where $d_R$ is a distance from the first end to the estimated position, d is a length of the telecommunications transmission line from the first end to the second end, $N_R(f)$ is the first result of the measurement of the noise level at the first end at frequency f, $N_O(f)$ is the second result of the measurement of the noise level at the second end at said frequency f, and H(f) is the magnitude of the telecommunications transmission line's transfer function from the first end to the second end at said frequency f.

3. The method according to claim 2, wherein the position estimate is generated for different frequencies and a further position estimate is generated as an average of the position estimates generated for the different frequencies.

4. The method according to claim 1, further comprising the step of generating an estimate of a noise power spectral distribution at the position where the noise enters the telecommunications transmission line, based on the relationship between the first and the second noise level measurement results.

5. The method according to claim 4 wherein the estimate of the noise power spectral distribution (PSD) is generated as $$N(f) = N_R(f) - \frac{d_R}{d} H(f).$$

6. The method according to claim 1, wherein the first communications equipment is a first frequency division multiplex (FDM) communications equipment which performs functions similar to an xDSL consumer premises equipment (CPE).

7. The method according to claim 1, wherein the second communications equipment is a second FDM communications equipment which performs functions similar to an xDSL digital subscriber line access multiplexer (DSLAM).

8. The method according to claim 1, wherein the telecommunications transmission line includes a copper pair wire.

9. A communications equipment having a plurality of transmit bands and adapted for use with the method of claim 1, wherein the communications equipment is adapted to measure quiet line noise (QLN) in at least one of the transmit bands.

10. The communications equipment according to claim 9 being adapted to measure the QLN at a plurality of frequencies used for reception or transmission of data.

11. The communications equipment according to claim 9, wherein the communications equipment is a consumer premises equipment (CPE) configured for use in a frequency division multiplex (FDM) environment.

12. The communications equipment according to claim 9, wherein the communications equipment is a frequency division multiplex equipment which performs functions similar to an xDSL digital subscriber line access multiplexer (DSLAM) in a frequency division multiplex (FDM) environment.

13. The equipment according to claim 9, wherein the communications equipment is adapted to make said transmit band QLN measurement in a passband of a filter through which the measurement is made.

14. The method of claim 1, further comprising:
measuring quiet line noise (QLN) in at least one of a plurality of transmit bands.

15. The method according to claim 14 wherein the QLN is measured at a plurality of frequencies used for reception or transmission of data.

16. The method according to claim 14, wherein said transmit band QLN measurement is made in a passband of a filter through which the measurement is made.

17. A device for estimating a position where noise enters a telecommunications transmission line the telecommunications transmission line having a first communications equipment connected to a first end of the line and a second communications equipment connected to a second end, opposite to the first end of the line, the device comprising:
means for receiving, via the telecommunications transmission line, a first result of a measurement of a noise level at the first end of the telecommunications transmission line made by the first communications equipment;
means for receiving a second result of a measurement of a noise level at the second end of the telecommunications transmission line made by the second communications equipment; and
means for generating an estimate of the position where the noise enters the telecommunications transmission line based on the relationship between the first and the second noise level measurement results where the first and second noise level measurements are made at the same frequency or frequency band and the frequency or frequency band falls within a transmit band of at least on of the first and second communications equipment.

18. The device according to claim 17, further having means for generating an estimate of a noise power spectral distribution at the position where the noise enters the telecommunications transmission line, based on the relationship between the first and the second noise level measurement results.

19. The device according to claim 17, wherein the telecommunications transmission line includes a copper pair wire.

20. A method of estimating a position where noise enters a telecommunications transmission line, the method comprising the steps of:

measuring a first noise level at a first frequency or frequency band at a first end of the transmission line by a consumer premises equipment (CPE);

communicating the measured first noise level over the telecommunications transmission line to an equipment at a second end of the transmission line, opposite the first end;

measuring a second noise level at the first frequency or frequency band at the second end by the equipment; and estimating, based on the relationship between the first and second noise level, the position where the noise enters the transmission line wherein the first frequency or frequency band falls within a transmit band of at least one of the CPE and the equipment.

* * * * *